United States Patent [19]
Falkson

[11] Patent Number: 5,231,791
[45] Date of Patent: Aug. 3, 1993

[54] INSECT TRAP

[75] Inventor: Alec S. Falkson, Noranda, Australia

[73] Assignee: Avond PTY LTD, Western Australia, Australia

[21] Appl. No.: 505,416

[22] Filed: Apr. 6, 1990

[30] Foreign Application Priority Data

Apr. 7, 1989 [AU] Australia ............ PJ3599

[51] Int. Cl.⁵ .................... A01M 1/02
[52] U.S. Cl. ............... 43/122; 43/107; 43/121
[58] Field of Search ............ 43/107, 122, 121

[56] References Cited

U.S. PATENT DOCUMENTS

| | | | |
|---|---|---|---|
| 1,497,800 | 6/1924 | Smith | 43/107 |
| 1,700,517 | 1/1929 | Ross | 43/121 |
| 1,900,199 | 3/1933 | Pickett | 43/107 |
| 2,478,104 | 8/1949 | Johnson | 43/122 |
| 4,244,135 | 1/1981 | Harwoods | 43/122 |
| 4,551,941 | 11/1985 | Schneidmiller | 43/107 |
| 4,930,251 | 6/1990 | Crisanti | 43/107 |

FOREIGN PATENT DOCUMENTS

| | | |
|---|---|---|
| 252083 | 12/1961 | Australia . |
| 24870/84 | 2/1984 | Australia . |
| 81329/87 | 9/1988 | Australia . |
| 1391643 | 4/1975 | United Kingdom ........ 43/107 |
| 1580233 | 11/1980 | United Kingdom . |
| 2143112A | 2/1985 | United Kingdom . |

Primary Examiner—Kurt C. Rowan
Attorney, Agent, or Firm—Harness, Dickey & Pierce

[57] ABSTRACT

An insect trap comprising a base defining a receptacle with an open top, a bait support supported by the base, the periphery of the base supporting an intermediate cover and a light transmissive cover, said intermediate cover having an aperture providing access between a first space defined between the intermediate cover the bait support and a second space between the intermediate cover and the light transmissive cover wherein the inter-engagement between the base and the light transmissive cover or the intermediate cover and the light transmissive cover comprises a pair of substantially concentric portions which are capable of relative rotation with respect to each other wherein each portion is formed with a set of apertures at spaced locations which can be brought into and out of alignment with respect to each other on relative rotation between the portions to vary the degree of access between the exterior of the insect trap and the first space.

32 Claims, 4 Drawing Sheets

INSECT TRAP

In one form the invention resides in an insect trap comprising a base defining a liquid receptacle with an open top, a bait support supported by the base, the periphery of the base supporting an intermediate cover and a light transmissive cover, said intermediate cover having an aperture providing access between a first space defined between the intermediate cover and the bait support and a second space between the intermediate cover and the light transmissive cover, wherein the inter-engagement between the base and the light transmissive cover, or the intermediate cover and the light transmissive cover comprises a pair of substantially concentric portions which are capable of relative rotation with respect to each other wherein each portion is formed with a set of apertures at spaced locations which can be brought into and out of alignment with respect to each other on relative rotation between the portions to vary the degree of access between the exterior of the insect trap and the first space.

In another form the invention resides in an insect trap comprising a base defining a liquid receptacle with an open top, a bait support extending across the base at or adjacent the open top, the periphery of the base supporting an intermediate cover and a light transmissive cover, said intermediate cover having an aperture therein providing access between a first space defined between the intermediate cover and the bait support and a second space between the intermediate cover and the light transmissive cover, a plurality of openings provided in the base or the intermediate cover, and the light transmissive cover to provide access between the exterior of the insect trap and the first space and a porous element extending between the liquid receptacle and the bait support to deliver liquid to the bait support by capillary action.

The invention will be more fully understood in the light of the following description of one specific embodiment. The description is made with reference to the accompanying drawings of which:

Figure 1:
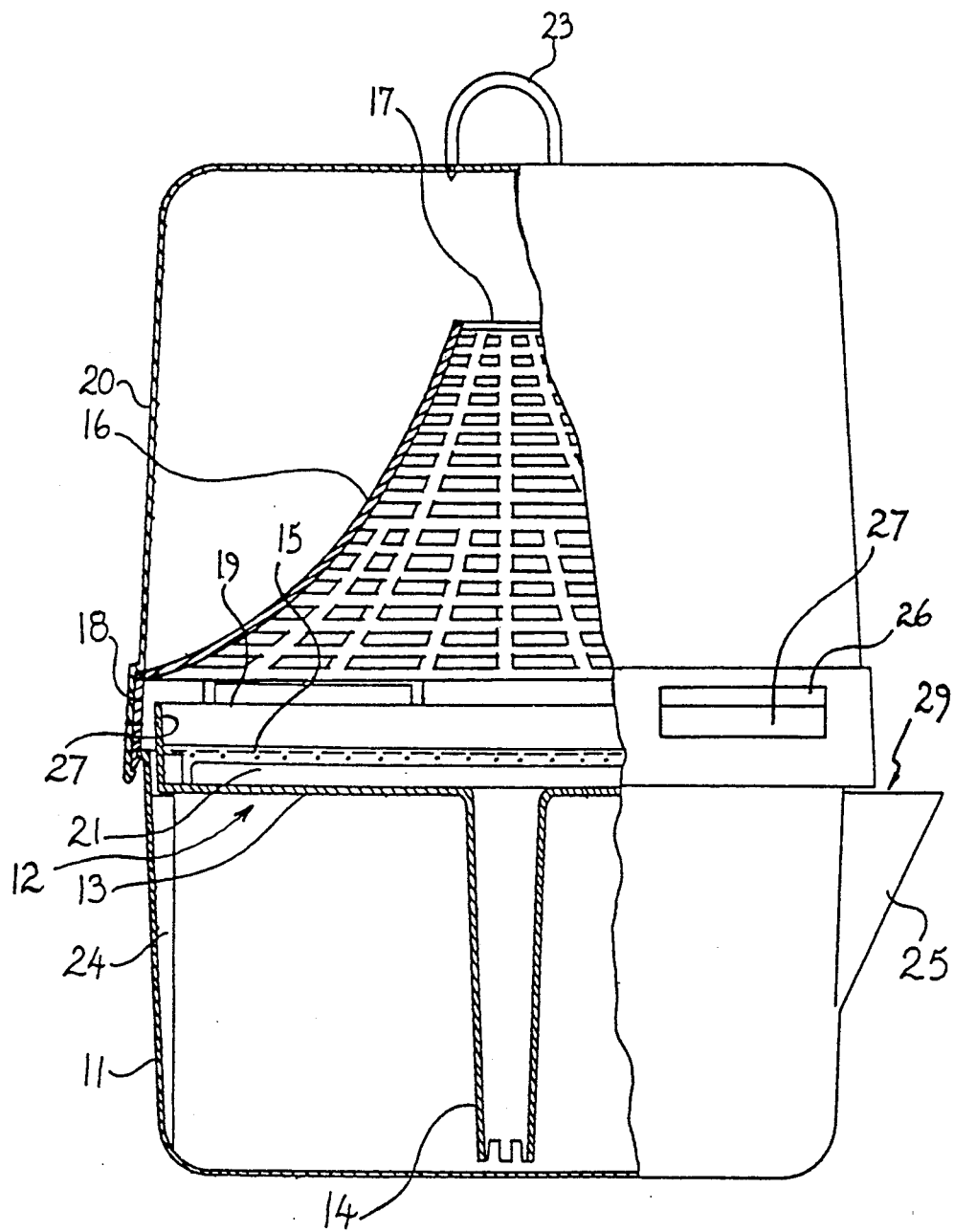
FIG. 1 is a schematic sectional elevation of the first embodiment.

The first embodiment as shown at FIG. 1 comprises a cup shaped base 11 which is of substantially circular cross section whereby the walls are slightly convergent downwardly. The base 11 supports a bait support 12 from a set of vanes 24 provided on the interior of the base. The bait support comprises a shallow dish like member which is engaged by the vanes 24 to be supported adjacent the upper edge thereof. The dish portion 12 is formed with a downwardly extending tubular spigot 14 which extends into the base 11 and which is filled with a porous element through which water can flow at least by capillary action. The dish like member 12 supports a mesh like panel above the floor 13 of the dish in spaced relation thereto.

The base 11 is associated with an intermediate cover or conical element 16 having a periphery which is engagable at its outer edge with the upper periphery of the base 11. The conical portion of the conical element 16 may take any desired form of conical configuration. The portion of the intermediate cover or conical element 16 overlying the bait support 12 may be substantially of the shape of an inverted cone. In addition the conical portion is formed to have a mesh like characteristic and terminates at its apex with an opening 17. The periphery of the conical element 16 is formed as a downwardly ending flange 18 which is firmly engaged and is supported by the upper edge of the base 11 and is provided around its periphery with a plurality of openings 19 which provide access into the space between the inner face of the conical element 16 and the bait support 12. The upper edge of the periphery of the conical element 16 supports a cover 20 formed of a light transmissive material which is transparent or translucent and has a substantially cylindrical configuration whereby one end is closed and the other is open. The open end of the cover is snugly received over the depending flange 18 having an outer circumferential face provided around the periphery of the conical element 16. The light The light transmissive cover 20 also extends over the side wall of the base immediately below the intermediate cover 16. The cover has a corresponding set of openings 26 to the openings 19 in the conical element and which can be aligned with the openings 19 in the conical element. The cover is rotatable on the conical element to facilitate closure of the openings 19 in the conical element or a variation in the dimension of the opening. In addition the side 27 of the bait support while being spaced inwardly from the aperture 19 in the conical element 16 serves to block a direct path between the space below the conical element 16 and the apertures 19.

In use the base is partially filled with water and the bait support 12 is located within the base such that the lower end of the tubular spigot 14 extends into the water and as a result water is conveyed by capillary action through the element to the dish like portion 13. A powder or paste or a tablet of bait material is placed within the dish portion 13 and the mesh screen or panel 15 is placed over the tablet. As a result water conveyed by the porous element slightly moistens the tablet 21 to render it attractive to flies and insects while the mesh is dimensioned to prevent direct access of the flies and insects through the mesh to the bait. The conical element 16 is then placed over the base such that it overlies the bait support element and the cover placed over the conical support. When the trapping of insects is desired the cover 20 is counter rotated relative to the conical element to bring the respective set of openings 19 and 26 into alignment. The size of the opening can be varied as required.

Suitable fixing means may be provided to retain the bait support 12 in position within the base 11, the conical element in position on the base 11 and the cover in position on the conical element. In addition, if desired, a hook 23 may be fixed to the centre of the upper surface of the cover to enable the insect trap to be hung in any suitable location.

In addition the side wall of the base is formed with an opening 29 which opens into an upstanding weir portion 25 having an upper level which is below the bait support in order that the base can be filled and replenished with water without the need to disassemble the insect trap.

When in use flies will be attracted into the first space between the conical element and the bait support through the variable openings 19 provided in the flange 18 of the conical support element 16, and the openings 26 in the cover 20. The flies will then be attracted to the light provided by the aperture 17 at the apex of the cone and will then enter into the second space between the cover and the conical element 16 to become trapped therein where they ultimately die. When it becomes necessary to empty the dead flies from the container the conical element is disengaged from the base 11 with the cover and is inverted whereby the dead flies will then fall to the closed end of the cover. At that time the cover can be disengaged from the conical element and discarded or emptied and subsequently be replaced on the conical element. If desired the cover 20 and/or the conical element may be formed as disposable members which are discarded to be replaced by a clean cover and, if desired, a new conical element.

Figure 2:
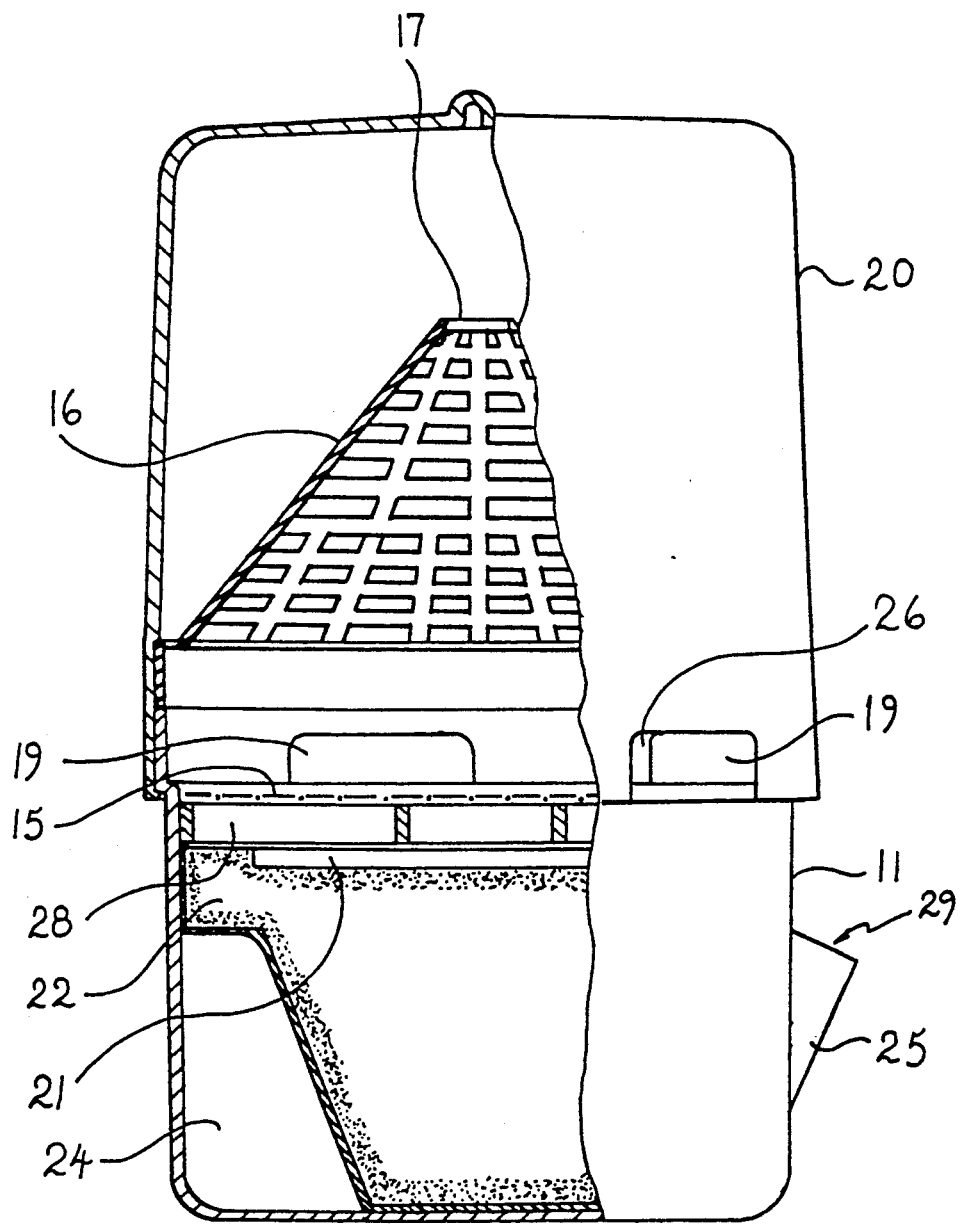
FIG. 2 is a part sectional elevation of the second embodiment.
Figure 3:
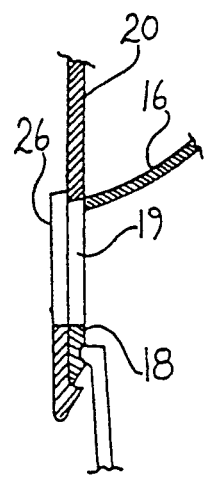
FIG. 3 is a cross-sectional view showing the interengagement between the light transmissive cover and the intermediate cover.

The second embodiment shown at FIG. 2 comprises an alternative construction of the embodiment in which the principal difference resides in the nature of the bait support which takes the form of a block 22 of foam material which is supported by a set of vanes 24 provided around the interior of the base 11. The block 22 is formed with a central recess 21 which is intended to accommodate a bait in the form of a pellet or powder or paste while the foam provides for the flow of fluid to the pellet by capillary action.

The upper edge of the base 11 is formed with a plurality of opening 19 a spaced around the periphery of the upper edge and which can be aligned with a corresponding set of apertures 26 in the cover 20 with relative rotation between the cover and conical element.

Figure 4:
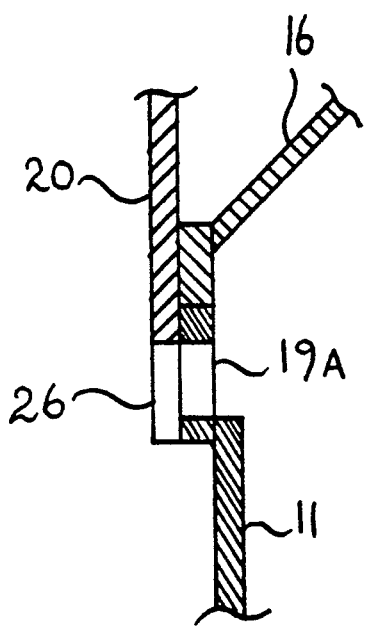
FIG. 4 is a cross-sectional view showing the interengagement between the light transmissive cover and the base.

This arrangement is also shown in FIG. 4 wherein the plurality of openings 19A in the base 11 correspond to the openings 26 of the cover 20 such that the openings 26 can be brought into and out of alignment with the openings 19A on relative rotation of the cover 20 to vary the degree of access between the exterior of the insect trap and the first space. The openings 26 may be apertures, or rebates around the lower edge of the light transmissive cover 20 as shown in FIGS. 2 and 4. The base also supports a ring shaped support 28 which is to be supported above the form block 22 and supports a mesh element 15 to prevent access to the bait by the insects attracted into the trap.

If desired a weir of the same form as that discussed in relation to the first embodiment may be provided in the base 11 to facilitate the replenishment of water in the base.

It is a feature of the embodiments that the bait is only slightly moistened by moisture by the utilisation of the capillary flow pathway provided between the base and the bait. As a result while the bait provides sufficient odour to be attractive to flies and insects, the odour is not to the extent that it is overly offensive to persons in the near vicinity to the insect trap. In addition the rate of degeneration of the tablets is reduced increasing thus the life of the bait within the bait support.

It is a further feature of the invention that the trap can be activated and deactivated at will by relative rotation of the light transmissive cover with respect to the intermediate cover and/or the base.

It should be appreciated that the scope of the present invention need not be limited to the particular scope of the embodiment described above.

I claim:

1. An insect trap comprising a base having a side wall and defining a receptacle with an open top, a bait support supported by the base, the periphery of the base supporting an intermediate cover and a light transmissive cover, said intermediate cover having an aperture providing access between a first space defined between the intermediate cover and the bait support and a second space between the intermediate cover and the light transmissive cover, wherein the interengagement between the intermediate cover and the light transmissive cover comprises a pair of substantially concentric portions which are capable of relative rotation with respect to each other wherein each portion is formed with a set of apertures at spaced locations which can be brought into and out of alignment with respect to each other on relative rotation between the portions to vary the degree of access between the exterior of the insect trap and the first space.

2. An insect trap as claimed at claim 1, wherein the base provides a liquid receptacle below the bait support and wherein the bait support is associated with a porous element extending between the liquid receptacle and the bait support for delivering liquid to the bait support by liquid capillary action.

3. An insect trap as claimed at claim 1, wherein the side wall of the base has an upper edge and wherein the intermediate cover is supported at the upper edge of the base.

4. An insect trap as claimed at claim 1, wherein the intermediate cover has an outer circumferential face and wherein the light transmissive cover extends over the outer circumferential face of the intermediate cover.

5. An insect trap as claimed at claim 3, wherein the intermediate cover has an outer circumferential face and the light transmissive cover extends over the outer circumferential face of the intermediate cover.

6. An insect trap as claimed at claim 4, wherein the light transmissive cover extends over the side wall of the base immediately below the intermediate cover.

7. An insect trap as claimed at claim 5, wherein the light transmissive cover extends over the side wall of the base immediately below the intermediate cover.

8. An insect trap as claimed at claim 1, wherein a portion of the intermediate cover overlies the bait support and wherein the portion of the intermediate cover is substantially of the shape of an inverted cone and is formed to have a mesh-like characteristic dimensioned to prevent the access of insects therethrough.

9. An insect trap as claimed at claim 1, wherein a mesh screen is supported to overlie the bait support at the portion of the first space adjacent the bait support wherein the mesh is dimensioned to prevent the access of insects through the screen.

10. An insect trap as claimed at claim 1, wherein the external side wall of the base is formed with an opening and a weir wherein the upper level of the weir is no higher than the bait support.

11. An insect trap as claimed at claim 2, wherein the bait support is formed as a dish like element supported across the base and said porous element is formed by a downward extension of the dish like element.

12. An insect trap as claimed at claim 2, wherein the porous element is formed with an upper surface which provides said bait support.

13. An insect trap comprising a base having a side wall and defining a liquid receptacle with an open top, a bait support extending across the base at or adjacent the open top, the periphery of the base supporting an intermediate cover and a light transmissive cover, said intermediate cover having an aperture therein providing access between a first space defined between the intermediate cover and the bait support and second space between the intermediate cover and the light transmissive cover, a plurality of openings provided in the intermediate cover and the light transmissive cover to provide access between the exterior of the insect trap and the first space, and a porous element extending between the liquid receptacle and the bait support to deliver liquid to the bait support by capillary action.

14. An insect trap as claimed at claim 13, wherein the bait support is formed as a dish like element supported across the base and said porous element is formed by a downward extension of the dish like element.

15. An insect trap as claimed at claim 13, wherein the porous element is formed with an upper surface which provides said bait support.

16. An insect trap as claimed at claim 13, wherein the dimensions of the openings are variable.

17. An insect trap as claimed at claim 16, wherein the side wall of the base has an upper edge and wherein the intermediate cover is supported at the upper edge of the base.

18. An insect trap as claimed at claim 17, wherein the intermediate cover has an outer circumferential face and the light transmissive cover extends over the outer circumferential face of the intermediate cover.

19. An insect trap as claimed at claim 18, wherein the light transmissive cover extends over the side wall of the base immediately below the intermediate cover.

20. An insect trap as claimed at claim 13, wherein a portion of the intermediate cover overlies the bait support and wherein the intermediate cover is substantially of the shape of an inverted zone and is formed with a plurality of second apertures which are dimensioned to prevent the access of insects therethrough.

21. An insect trap as claimed at claim 13, wherein a mesh screen is supported to overlie the bait support at the portion of the first space adjacent the bait support wherein the mesh is dimensioned to prevent the access of insects through the screen.

22. An insect trap as claimed at claim 13, wherein the external side wall of the base is formed with an opening and a weir wherein the upper level of the weir is no higher than the bait support.

23. An insect trap comprising a base having a side wall and defining a receptacle with an open top, a mesh screen supported by the base, the periphery of the base supporting an intermediate cover and a light transmissive cover, said intermediate cover having an aperture providing access between a first space defined between the intermediate cover and the mesh screen and a second space between the intermediate cover and the light transmissive cover wherein the inter-engagement between the base and the light transmissive cover comprises a pair of substantially concentric portions which are capable of relative rotation with respect to each other wherein each portion is formed with a set of openings at spaced locations which can be brought into and out of alignment with respect to each other on relative rotation between the portions to vary the degree of access between the exterior of the insect trap and the first space, wherein the intermediate cover has a depending flange having an outer circumferential face and wherein the light transmissive cover extends over the outer circumferential face of the intermediate cover and extends over the side wall of the base immediately below the intermediate cover.

24. An insect trap as claimed at claim 23, wherein the base provides a liquid and bait receptacle below the mesh screen.

25. An insect trap as claimed at claim 23, wherein the side wall of the base has an upper edge and wherein the intermediate cover is supported at the upper edge of the base.

26. An insect trap as claimed at claim 23, wherein the openings in the substantially concentric portion of the light transmissive cover are apertures.

27. An insect trap as claimed at claim 25, wherein the intermediate cover has an outer circumferential face and wherein the light transmissive cover extends over the outer circumferential face of the intermediate cover.

28. An insect trap as claimed at claim 23, wherein the openings in the substantially concentric portion of the light transmissive cover are rebates.

29. An insect trap as claimed at claim 27, wherein the light transmissive cover extends over the side wall of the base immediately below the intermediate cover.

30. An insect trap as claimed at claim 23, wherein a portion of the intermediate cover overlies the mesh screen, the portion of said intermediate cover being substantially of the shape of an inverted cone and formed to have a mesh-like characteristic dimensioned to prevent the access of insects therethrough.

31. An insect trap as claimed at claim 23, wherein the mesh screen is dimensioned to prevent the access of insects through the screen.

32. An insect trap as claimed at claim 23, wherein the external side wall of the base is formed with an opening and a weir having an upper level positioned so that the base can be filled with water without disassembling the insect trap.

* * * * *